(12) United States Patent
Abidine (10) Patent No.: US 10,343,121 B2
(45) Date of Patent: Jul. 9, 2019

(54) MANUFACTURE OF A FILTRATION MEMBRANE

(71) Applicant: ABC MEMBRANES, Donneville (FR)

(72) Inventor: Nouhad Abidine, Donneville (FR)

(73) Assignee: ABC MEMBRANES, Donneville (FR)

( * ) Notice: Subject to any disclaimer, the term of this patent is extended or adjusted under 35 U.S.C. 154(b) by 322 days.

(21) Appl. No.: 15/029,987

(22) PCT Filed: Oct. 16, 2014

(86) PCT No.: PCT/FR2014/052640
§ 371 (c)(1),
(2) Date: May 10, 2016

(87) PCT Pub. No.: WO2015/055960
PCT Pub. Date: Apr. 23, 2015

(65) Prior Publication Data
US 2016/0250602 A1    Sep. 1, 2016

(30) Foreign Application Priority Data

Oct. 17, 2013  (FR) ...................... 13 60134

(51) Int. Cl.
| | | |
|---|---|---|
| *B01D 69/06* | (2006.01) | |
| *B01D 69/10* | (2006.01) | |
| *B01D 69/08* | (2006.01) | |
| *B01D 63/02* | (2006.01) | |

(Continued)

(52) U.S. Cl.
CPC ........... *B01D 69/087* (2013.01); *B01D 63/02* (2013.01); *B01D 63/021* (2013.01);
(Continued)

(58) Field of Classification Search
CPC ...... B01D 63/066; B01D 63/08; B01D 69/08; B01D 69/10; B01D 69/06; B01D 67/0009;
(Continued)

(56) References Cited

U.S. PATENT DOCUMENTS

| | | | |
|---|---|---|---|
| 4,230,463 A | 10/1980 | Henis et al. | |
| 5,500,167 A * | 3/1996 | Degen | ................... B01D 69/10 |
| | | | 210/490 |

(Continued)

FOREIGN PATENT DOCUMENTS

| | | |
|---|---|---|
| EP | 0761292 A1 | 3/1997 |
| EP | 1031526 A2 | 8/2000 |

OTHER PUBLICATIONS

Chung et al., Chemical Engineering Science 55 (2000) 1077-1091. (Year: 2000).*

*Primary Examiner* — Pranav N Patel
(74) *Attorney, Agent, or Firm* — Seed IP Law Group LLP (57) ABSTRACT

A method for manufacturing a filtration membrane includes: a) selecting and preparing an organic polymer, such as a collodion; b) injecting a collodion into at least one channel of an extrusion die that also comprises an extrusion die core and at least one outlet; c) injecting an internal liquid into a hollow centering pin, the hollow centering pin comprising a channel positioned on the core of the extrusion die and also positioned at an axis of the outlet of the extrusion die; d) applying a holding film to the outlet of the extrusion die; e) unrolling the holding film onto a surface of at least one hollow fiber emerging from the outlet of the extrusion die; f) immersing the hollow fiber with the first holding film in a rinsing solution so as to obtain a flat hollow fiber filtration membrane; and ending the rinsing of the filtration membrane.

8 Claims, 4 Drawing Sheets

(51) Int. Cl.
  *B01D 71/42* (2006.01)
  *B01D 71/68* (2006.01)
  *B01D 69/02* (2006.01)

(52) U.S. Cl.
  CPC ............ *B01D 69/081* (2013.01); *B01D 69/10* (2013.01); *B01D 71/42* (2013.01); *B01D 71/68* (2013.01); *B01D 69/02* (2013.01); *B01D 2323/08* (2013.01); *B01D 2325/04* (2013.01); *B01D 2325/28* (2013.01)

(58) Field of Classification Search
  CPC ............ B01D 67/0011; B01D 67/0013; B01D 67/0016; B01D 2323/12; B01D 2323/42; B29C 47/0028; B29L 2031/601
  See application file for complete search history.

(56) References Cited

U.S. PATENT DOCUMENTS

| | | |
|---|---|---|
| 6,454,943 B1 | 9/2002 | Koenhen |
| 6,787,216 B1* | 9/2004 | Koenhen ............. B01D 63/066 156/244.13 |
| 8,114,478 B1* | 2/2012 | Koreltz ............. B01D 67/0009 427/244 |
| 2004/0154978 A1* | 8/2004 | Sale .................. B01D 67/0011 210/488 |
| 2007/0187320 A1 | 8/2007 | Mabuchi et al. |
| 2011/0114559 A1 | 5/2011 | Fislage et al. |
| 2011/0193096 A1 | 8/2011 | Imada |
| 2012/0097604 A1 | 4/2012 | Cote et al. |

* cited by examiner

MANUFACTURE OF A FILTRATION MEMBRANE

TECHNICAL FIELD

The present invention relates to the field of membrane filtration and more particularly to the manufacture of a hollow fiber filtration membrane associated with a support film.

TECHNICAL BACKGROUND

An important aspect of the manufacture of this type of membrane is related to the quality of the inner and outer surfaces of the hollow fibers and the fragility of the resulting membranes. Therefore, a method is usually used that includes particularly delicate steps in order to avoid mechanical stress and physical damage to the membranes.

PRIOR ART

The manufacture of organic membranes is based on the principles of phase separation (dry, wet, thermal) or foaming, and even irradiation followed by appropriate chemical treatment(s). The steps in manufacturing a membrane produced according to the principle of liquid-liquid phase separation are seemingly simple. But in reality, it is a complex process to manufacture a membrane because it is possible to obtain membranes that perform very differently, from a same formulation (collodion). Indeed, the geometry of the spinneret and/or casting device used, the thermal conditions, the nature of the precipitation liquid, and the draw conditions are all factors that influence the ultimate performance of the membrane.

Conventionally, production of a membrane in the form of a hollow fiber includes several steps such as extrusion of the fiber, rinsing, posttreatment, and winding or bundling.

In general, an extrusion spinneret places a collodion in contact with a centering or precipitation liquid. The collodion is forced to divide around a centering needle, into which is injected either a precipitation (or coagulation) liquid in order to form a fiber having an inner skin, or a centering liquid in order to form a hollow fiber having an outer skin. The flow rate and temperature of the collodion and the internal (bore) liquid supplied to the extrusion spinneret are controlled.

According to this protocol, the nascent fiber falls into a bath which serves to precipitate the outer surface of the fiber in the case of a hollow fiber having an outer skin, or to begin rinsing it in the case of a hollow fiber having an inner skin. The nascent fiber thus formed is advanced to a rinsing bay. Rinsing the fiber may be followed by posttreatment that preserves its hydraulic performance as it dries, a step necessary for fiber bonding. The fiber is then wound onto a spool for later use or is directly bundled into a specific form.

When producing a hollow fiber through an extrusion spinneret, the surface state of the centering needle and, more importantly, the surface state of the extrusion orifice can cause the formation of major defects in its inner and outer surface. Experience has shown that certain defects on the external portion of the centering needle have little or no influence on the surface state of the inner skin of the fiber. In contrast, it has been noted that an even slightly degraded surface of the extrusion orifice can cause major defects in the outer surface of the fiber.

The presence of the slightest defect on the inner perimeter of the extrusion orifice of a spinneret can therefore significantly impact the quality of the surface of the nascent fiber. In fact, the swelling which occurs in the nascent fiber increases the impact of existing defects on the perimeter of the extrusion orifice. Different types of surface defects or problems are seen on the outer surface of a fiber: rectilinear indentations following the direction of flow, flaw marks, and tears. It is difficult to change the manufacturing conditions to minimize the impact of the surface state of the spinneret on the defects formed on the outer surface of the fiber. To correct the problem, it is essential to constantly resurface the face of the extrusion orifice. Generally, the extrusion spinneret must be changed, which considerably increases the manufacturing cost of the membranes.

When it exits the spinneret, the fiber is then passed through a precipitation or rinsing bath in which it is in contact with take-up rollers and drive rollers ensuring the continuity of the spinning operation. The outer surface of a hollow fiber or the active surface of a flat membrane is often damaged by the presence of scratches or burrs on the face of the advancement means which come into contact with them. The surface state of these elements must therefore be checked periodically and the surfaces concerned must be corrected.

At this stage, the fiber, still charged with solvent, is drawn at a rate that is greater than the natural rate of extrusion in order to manage spinning continuity. Some membrane manufacturers take advantage of the influence of such drawing on the porous structure of the membrane, to give the pores a particular shape. The membranes so produced have a semicrystalline structure, which can accelerate their aging and thereby limit their attraction.

Depending on the surface state of the rollers and on the draw conditions imposed, the fiber may suffer damage which can be very significant. Observations made by scanning electron microscopy have shown that the outer surface of a fiber or the active surface of a flat membrane is very often damaged: indentations, marks, and tears are present on a regular basis. These major defects affect the retention performance of membranes produced in this manner. Experience has shown that these defects are the cause of accelerated chemical, mechanical, or thermal aging of membranes.

The production of a membrane without such defects would not only improve its initial separation performance, but would also give it better stability with respect to chemical, thermal, and mechanical aging.

Conventionally, the nature of the external bath also has an influence in the production of hollow fibers. As the fibers are produced at spinning speeds ranging from several meters to several tens of meters per minute, the time the nascent fiber remains in the air is very short. Several parameters of the conventional method for manufacturing hollow fibers can be adapted to overcome this disadvantage.

It is possible to make use of the more or less slow precipitation of the collodion so as to form a true filtering skin on the outer surface of the fiber. Some manufacturers use this property to produce "double skin" membranes. However, the presence of this dual filtration barrier results in poor hydraulic performance. In addition, as previously indicated, the presence of numerous advancement means creates surface defects that can degrade the separation performance of the outer skin of the membrane.

Another possibility is to vary the concentrations of pore forming agents. The use of collodions with a high concentration of pore forming agents has been proposed to bring the support polymer to the phase separation limit. This then results in the formation of hollow fibers which have attractive water permeabilities but poor selectivity performance.

Indeed, this type of membrane has filtration pores with a wide pore size distribution. Often these collodions also contain microgels which are the cause of many defects affecting selectivity and accelerating the chemical, thermal, and mechanical aging of the membranes so produced.

The use of collodions with a reduced concentration of pore-forming agents allows obtaining relatively stable collodions, a key factor in ensuring reproducibility in the manufacture of membranes. However, the spinning speeds are limited with such collodions. To maintain production capacity, we must therefore increase the number of fibers produced in parallel, which intensifies spinning difficulties and gives rise to additional problems.

In addition, flat and hollow fiber membranes produced with an identical formulation did not provide the same hydraulic performance. Generally, flat membranes produced on a woven or nonwoven support have a water permeability that is improved by a significant factor (2 to 5). A flat membrane can thus have a water permeability of 1000 $l/h \cdot m^2 \cdot bar$ while a hollow fiber produced under the same precipitation conditions (same collodion, same precipitation liquid, and same temperature) has a water permeability of close to 200-300 $l/h \cdot m^2 \cdot bar$.

SUMMARY OF THE INVENTION

To overcome some or all of the disadvantages of the prior art described above, a method is provided for the rapid manufacture of a filtration membrane, that is economical in materials and provides good reproducibility. The filtration membrane resulting from this method is particularly resistant and efficient.

More specifically, the method for manufacturing a filtration membrane comprises the following steps:
a) selecting and preparing an organic polymer such as a collodion,
b) injecting a collodion into at least one channel of an extrusion spinneret that further comprises an extrusion spinneret core and at least one outlet,
c) injecting an internal liquid into a hollow centering needle which comprises a channel positioned at the core of the extrusion spinneret and which is positioned at an axis of the outlet of the extrusion spinneret,
d) applying a support film at the outlet of the extrusion spinneret,
e) unrolling the support film onto a surface of at least one nascent hollow fiber emerging from the outlet of the extrusion spinneret,
f) immersing the hollow fiber with the first support film in a rinsing solution so as to obtain a flat hollow fiber filtration membrane,
g) ending the rinsing of the filtration membrane thus obtained.

Generally, in order to shape this membrane successfully, injection of a a centering fluid containing excess solvent precedes injection of the collodion. This precaution prevents the centering needle from clogging due to capillary creep of the collodion, which would require cleaning the spinneret and restarting the spinning process.

There are several advantages of the method so defined, as will be detailed below.

As explained earlier, traditionally the manufacture of a hollow fiber is generally accompanied by multiple areas of damage to the fiber itself, whether due to the surface state of certain parts of the extrusion spinneret, the drive rollers, the drawing of the fibers, or the nature of the external bath. The method of the present invention overcomes these disadvantages by associating a support with the hollow fiber, serving to reinforce and protect the hollow fiber during the manufacturing process without impacting its filtration capabilities.

Supported flat membranes have already been described in the prior art. In those examples, drawing of the supported membrane is managed by pulling the woven or nonwoven support onto which is poured the collodion that will form the membrane. This support firmly maintains the active membrane and damps the transmission of some of the mechanical stress that could affect it. The hydrodynamic conditions when pouring this type of flat membrane can thus be adapted to minimize the role of the production speed. The stress is partly absorbed by the support in place of the collodion, which allows preserving the physicochemical properties of collodion during the membrane production process. However, the active surface of the resulting flat membrane comes in contact with numerous elements as it is advanced and rinsed. The quality of its active surface deteriorates, and many defects consequently affecting its filtration performance are formed on this surface.

Similarly, there are existing hollow fibers having an outer skin which are reinforced by a braided support to strengthen their radial and longitudinal mechanical strength. However, the active skin of these fibers is on their unprotected outer surfaces and they are therefore considerably damaged by their contact with the various advancement means during production. In addition, contact with the support affects the external-to-internal filtration of hollow fibers having an outer skin.

With the proposed method, the advantage due to using a support is applied to hollow fiber membranes having an inner skin, without the disadvantages mentioned above concerning flat membranes associated with a support and concerning hollow fibers having an outer skin that are associated with a support. A membrane with hollow fibers having an inner skin forming a plurality of channels so supported and protected preserves the intrinsic membrane properties resulting from the nature of collodion while avoiding defects on the outer surface of said hollow fibers having an inner skin. External-to-internal filtration of hollow fibers having an inner skin is not impacted by contact with the support. This combination of support/hollow fibers having an inner skin also gives the membranes improved performance compared to known membranes. Furthermore, this novel membrane production technique has never been described nor implemented.

The method enables the production, at high spinning speed, of membranes with hollow fibers having an inner skin providing a plurality of channels. Indeed, the nature of the rinsing bath is a vital factor for hollow fibers having an inner skin. To manage the porosity of the outer surface of the fiber with precision, water/solvent mixtures must be used to control the phase separation that occurs on the outer surface of the fibers. However, the use of such mixtures generally reduces the fiber spinning speed considerably and requires the use of a rinsing bath of very large volume. With our novel form of membranes, the ratio of pore volume/effective filtration area is minimized because the thickness of the porous section which surrounds the filter channel is significantly reduced. Precipitation of the membrane is then faster because it depends on the overall thickness of the membrane, and the time required for rinsing the membrane is reduced at the same time.

The implementation of the method can thus produce a membrane containing one or a plurality of channels formed by the hollow fibers having an inner skin and supported by at least one support film, this support film preferably being a nonwoven support. In one particular embodiment, the same support may be directly welded to a drainage mesh which will therefore be on the outer surface of the membranes so produced.

Multi-channel membranes manufactured according to embodiments of the method can be produced in parallel using a production chain that is particularly simple and inexpensive.

The channels of the hollow fibers so produced have a relatively broad range of diameters. Channels having diameters preferably between 0.6 and 1.5 mm can thus easily be produced, with the possibility of extending the range of diameters to 0.2 to 3 mm.

In one particular embodiment, a second support film is applied and unrolled at the outlet of the extrusion spinneret, thereby improving the mechanical strength of the flat hollow-fiber membrane.

To protect the nascent hollow fiber at the outlet of the extrusion spinneret, the membrane is positioned between the first and second support film. It is then immediately protected from the hazards of the manipulations and contacts it would be exposed to if these supports did not exist. The characteristics of the support film may be selected according to the filtration performance of the membranes to be produced. It is therefore unnecessary to use a thick and robust support if the membrane is intended for use at low pressures or if the base collodion allows producing a membrane with strong mechanical properties. The supports may be treated according to the collodion composition used; it is possible to dry the support or wet it with a suitable solvent beforehand in order to control collodion penetration. This allows controlling the connection between the polymer matrix of the membrane and the porous support used to strengthen it.

In comparison to hollow fibers produced with identical formulations, the linear speed of production of membranes produced according to embodiments of the method can be increased by approximately 50% or more. This is due to the decreased thickness of the membrane to be precipitated and formed. Therefore the production capacity can be doubled or tripled for example. In addition, with an effective membrane width of 40 mm, it is possible, for example, to simultaneously produce twenty to forty channels in parallel. Compared to conventional production conditions, the production capacity is multiplied by a factor of between 2 and 8 depending on whether the number of filaments produced in parallel is 16 or 8 filaments. Advantageously, with the proposed method, the resulting membranes are protected and maintained, and have strictly controlled separation performance.

Moreover, the method eliminates the influence of the composition of the external bath, which here only serves as the rinsing bath and will usually be minimized because the membranes will be rinsed by spraying them with water through injection nozzles.

The rest of the manufacturing operation can proceed as required by the manufacturing process: finishing the rinsing, posttreatment, and storing the membranes after drying for later production of filtration modules. This manufacturing method makes it possible to produce membranes while minimizing the waste of materials used to produce a module having a given filtration area. If so required by the manufacturing process, the membranes leaving the first rinsing bath are fed to continuous washing elements then bundled or wound onto spools. The membranes are then given their final wash, then posttreatment and drying before grouping them into modules for the bonding operation.

In one particular embodiment, the internal liquid may comprise degassed water alone or mixed with another substance. The degassed water makes it possible to obtain excellent results when implementing the method.

The addition of a solvent or other additive to the internal precipitation liquid allows regulating the characteristics of the filtering skin produced, according to many known publications that are in the public domain.

Preferably, during step b), the collodion and the internal liquid can be brought to a temperature between 30 and 60° C. These temperatures enable optimum implementation of the method.

In one particular embodiment, the support film is, for example, a nonwoven polypropylene-based film. This choice is explained by the strength and the low cost of such a support. However, the use of a polyester-based support may be advisable depending on the requirements of the application.

Advantageously, the membrane with hollow fibers having an inner skin presenting a plurality of channels exiting the extrusion spinneret can be set in motion by the effect of a tractive force applied to the support film with which it is associated. Such a pulling force may, for example, be obtained by an assembly of two rollers placed at each end of the membrane. These rollers may be located on either side of the spinneret and close to the membrane exit. In this case, the two supports are pulled, by their lateral ends, at a constant speed into a bath containing a liquid which begins rinsing the membrane; however, they could also be sprayed by the rinsing liquid in order to minimize the implementation cost of this bath.

Advantageously, the filtration membrane may be cut after step e) so that said filtration membrane has closed or open inner surfaces. When it leaves the rinsing bath, the film may be cut automatically to produce membranes of a given length. The cutting tool can thus provide closed or open inner surfaces depending on manufacturing requirements.

In one particular embodiment, the method for manufacturing a filtration membrane may comprise an additional step of crushing the filtration membrane to facilitate bending it. It is thus possible to leave areas of smaller width with no filtration channels, to allow bending the film so created. The location of these areas is chosen according to the geometric characteristics of the module to be produced. In the case of a plate/cartridge module, the presence of these areas is not necessary.

A filtration membrane is also proposed, comprising at least one hollow fiber having an inner skin composed of an organic polymer and associated with a support film. Such a filtration membrane preferably comprises a plurality of hollow fibers having an inner skin and allows obtaining particularly advantageous filtration performance.

Preferably, the support film is of a porous nature, which allows improving the filtration of treated solutions without compromising membrane transfer and strength.

A final aspect concerns the use of a filtration membrane as defined above, and preferably produced according to the method of the invention, for the manufacture of a filtration module. Such a module has particularly advantageous properties for the filtration of water or for separation, concentration, or purification of any other fluid.

BRIEF DESCRIPTION OF DRAWINGS

Other features and advantages of the invention will become apparent upon reading the following description.

This is purely illustrative and should be read with reference to the accompanying drawings, in which.

DETAILED DESCRIPTION OF EMBODIMENTS

The description of embodiments of the method is given below with reference to some examples.

Example 1—Membranes Based on Polyethersulfone (PES)

Figure 1:
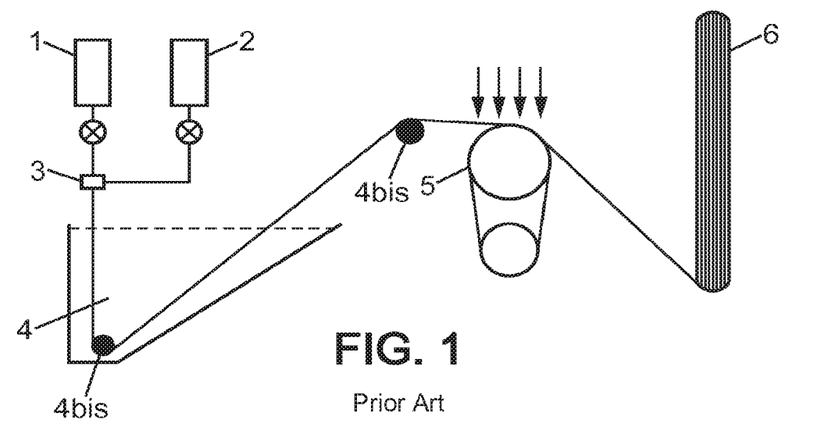
FIG. 1 shows a schematic example of a spin assembly for implementing a conventional extrusion method.

A spin assembly as shown in FIG. 1 can be used for the production of conventional filtration membranes by extrusion. Such an assembly comprises a tank of collodion 1 and a tank of internal liquid 2, both connected to an extrusion spinneret 3 that allows forming a nascent fiber. This nascent fiber falls into a precipitation bath 4 and, by means of take-up rollers 4b is, is guided toward a rinsing bay 5 and a bundling machine 6 which is used to roll it. For experimental spinning, the bundling machine 6 is not used and the nascent fiber falls directly into a basin of water extending to the exit from the large roller of the rinsing bay 5, which advances it forward.

To manufacture conventional membranes based on polyethersulphone (PES), collodion can be prepared from a polymer mixture containing 16% Veradel 3100P polyethersulfone in the presence of 6% polyvinylpyrrolidone K30 in N-methylpyrrolidone, while stirring and at a temperature maintained at 80° C.

The collodion is then filtered through metal mesh (5 micron filtration rating) and transferred to a storage tank where it is vacuum-degassed and then stored at a temperature of about 50° C.

The internal precipitation fluid in this example is water that is degassed by ultrasound and then stored prior to use in a tank maintained at, for example, 50° C.

The hollow fiber is produced with the collodion and internal fluid at a temperature of 50° C. A specific extrusion spinneret is used to produce a fiber having an inner diameter of 0.85 mm and an outer diameter of 1.45 mm. The spinning speed used is 16 m/min.

Figure 2:
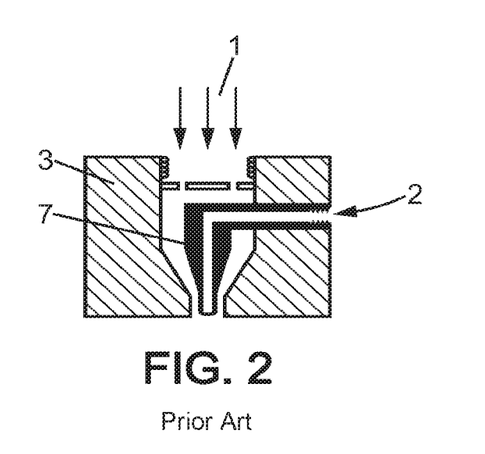
FIG. 2 is a front sectional detail view of an extrusion spinneret for implementing a conventional extrusion method.

FIG. 2 illustrates the flow of the collodion 1 and of the internal liquid 2 within the extrusion spinneret 3 in more detail. The internal liquid 2 is injected into a centering needle 7 in which the channel is positioned at the core of the extrusion spinneret at its axis. The channel of the extrusion spinneret is fed collodion 1 upstream of the centering needle 7 so that the internal liquid 2 is fully covered by the collodion 1 when exiting the extrusion spinneret.

The precipitation bath 4 which begins the fiber rinse is filled with water maintained at 40° C. The fiber exiting the bath is advanced by a large motorized roller located at the rinsing bay 5 which releases it into a basin filled with water. The water temperature is also maintained at 40° C. in this basin, where the rinsing of the fiber and thus the removal of residual solvent is completed.

After 24 hours of soaking in water, a long piece of fiber is cut to produce a module containing 12 fibers. The total length of this micromodule is equal to 30 cm, which represents an effective filtration length of 26 cm and a filtration area of 83 cm$^2$.

An initial test measurement of the water permeability of the membranes shows that the fibers thus obtained are only slightly permeable to water. In order to regain permeability in these fibers, two solutions are considered:

1) soaking the produced hollow fibers in water at 80° C. for 10 hours, 2) soaking the produced hollow fibers in water at 30° C. containing 500 ppm of NaClO (pH adjusted to 10) for 24 hours.

The permeability measurements in water brought to 20° C. (Lp20) in a micromodule of fibers treated in this manner are as follows:

| | Lp20 (L/h · m$^2$ · bar @ 20° C.) |
|---|---|
| Fibers rinsed with water at 80° C. for 10 hours | 650 |
| Fibers soaked in water at 30° C. with 500 ppm of NaClO (pH 10) | 720 |

The rise in the water permeability index observed here is mainly due to elimination of the free polyvinylpyrrolidone trapped between the polymer networks of polyethersulfone.

With the same collodion 1, it is possible to produce a filtration membrane according to the invention, formed of 33 channels covered with two nonwoven supports having the following characteristics:

nonwoven polypropylene-based support of technical quality, specially processed for use as a membrane support.

support thickness of 60 microns.

a weight index of the support of 17 g/m$^2$.

Figure 3:
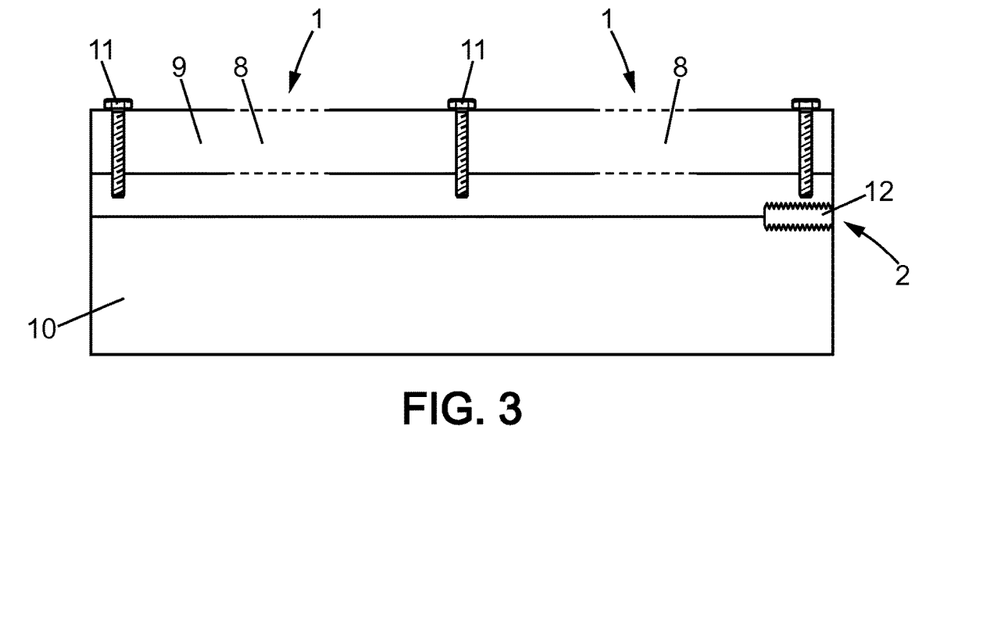
FIG. 3 is a front sectional view of an extrusion spinneret for implementing the proposed method.

An extrusion spinneret as depicted in FIG. 3 can thus be used in the method of the invention. In this FIG. 3, the frontal section shows the upstream orifices 8 of the extrusion spinneret through which the collodion 1 flows and then traverses an upper portion 9 of the extrusion spinneret. This upper portion 9 is connected to a lower portion 10 by means of screws 11. The internal liquid 2 is injected via centering needles 7 inside the extrusion spinneret, through the side port 12. In this example, 33 centering needles are distributed in a row along the extrusion spinneret, to create a filtration membrane having 33 channels.

Figure 4:
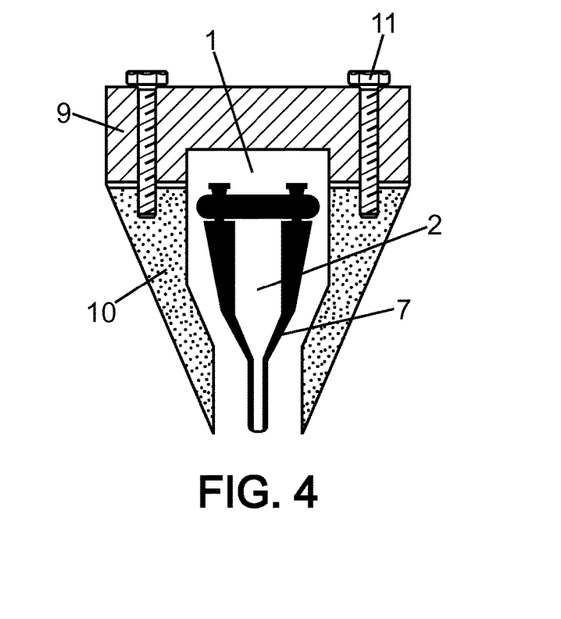
FIG. 4 is a side sectional view of the extrusion spinneret shown in FIG. 3, for implementing the method.

FIG. 4 shows a side sectional view of the arrangement of one of the centering needles 7 at the core of the extrusion spinneret, in the center of the lumen traversing said extrusion spinneret and through which the collodion 1 flows.

Figures 6, 7:
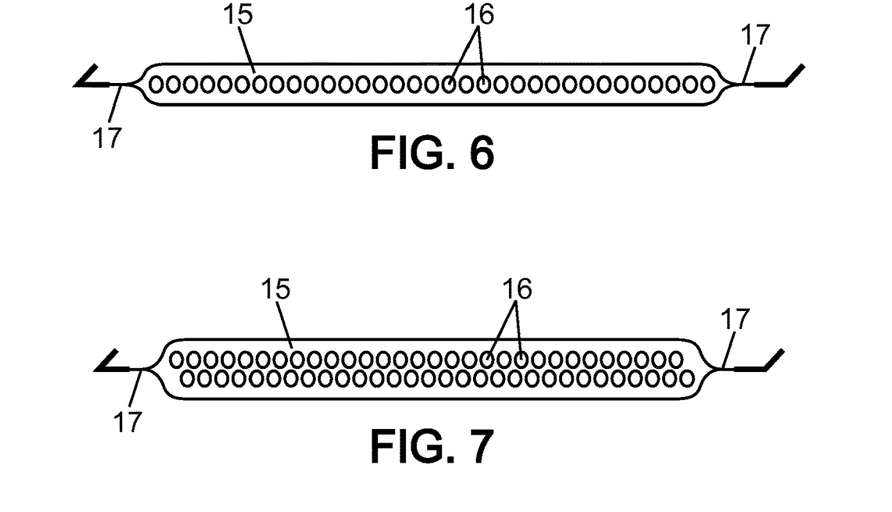
FIG. 6 is a cross-sectional view of a filtration membrane with a single row of channels obtained after implementing the method according to the invention.
FIG. 7 is a cross-sectional view of a filtration membrane with two rows of channels obtained after implementing the method.

The above precipitation conditions are used. The conditions of the collodion and internal liquid flow rates are fixed so as to produce a membrane with channels 0.85 mm in diameter. Two nonwoven supports (effective width of 35.2 mm and total width of 46 mm) are applied to the nascent multi-bore membrane in order to obtain a total thickness of 1.38 mm as shown in FIG. 6.

Figure 5:
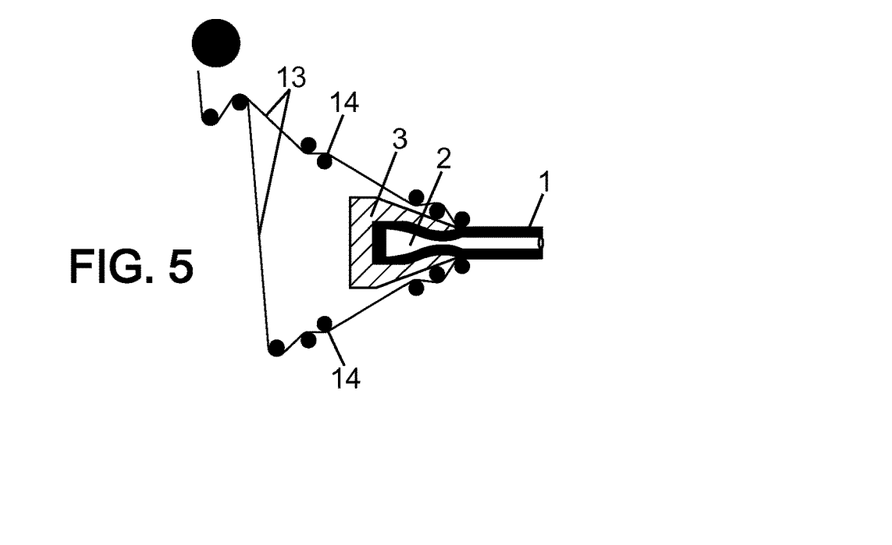
FIG. 5 is a side sectional view of the extrusion spinneret for implementing the method, representing the application of the support films.

FIG. 5 illustrates the application of the support film onto the nascent fiber, resulting in formation of the filtration membrane according to the method of the invention. The support films 13, in this case the nonwoven materials of this example, unwind and pass through various rollers 14 positioned at the perimeter of the extrusion spinneret and pressing said nonwoven supports 13 onto the outer walls of the nascent fiber exiting the extrusion spinneret. The support film immediately adheres to the nascent fiber flowing from the extrusion spinneret, due to capillary action and the wetting by the solvent used to prepare the collodion.

The two nonwoven supports serve to protect the fibers forming the channels of the membrane of the invention. The membrane so formed is produced at a spinning speed of roughly 16.5 m/min. This membrane is then advanced by a set of two rollers placed on both sides of the spinneret outlet. The membrane then slides directly into the U of two flattened half-tubes prepared and placed on both sides of the spinneret and which are oriented in the direction in which the membrane exits. This imposes a specific path for a distance that can be varied according to the rate of precipitation of the membrane. In the present case, the path is 3 m, which is sufficient for solidification of the nascent membrane and continuing with the other manufacturing steps. The membrane of the invention is then conveyed to a cutting member, which cuts it into lengths of 1.4 m that fall into a basin containing water where the rinsing continues.

Samples of these membranes are subjected to the same tests as above and are used to fabricate micromodules containing a single membrane that has an effective length of 26 cm (total length of 30 cm and filtration area of 229 cm$^2$).

Permeability measurements at 20° C. are as follows:

|  | Lp20 (L/h · m$^2$ · bar @ 20° C.) |
| --- | --- |
| Untreated NovaMem membrane | +/−0 |
| NovaMem membrane rinsed with water at 80° C. for 10 hours | 1500 |
| Fibers soaked in water at 30° C. with 500 ppm NaClO (pH 10) | 1640 |

One can see that the water permeability of the membranes of the invention is higher than that of conventional hollow fibers. One will also note that the conventional hollow fiber, although it has satisfactory mechanical properties (breaking load: 7 N-elongation at break: 45%), requires more care during manipulation than the filtration membrane of the invention which is protected by the nonwoven backing. In addition, the membrane of the invention is considerably more robust yet flexible and is manipulated via the support that surrounds it and protects its outer surfaces. Moreover, the covering of the contact surface of the support film with collodion is controlled so as to form a membrane where its performance is linked to the composition of the collodion and to the process conditions used during spinning, and is no longer dependent on the advancement conditions used, further contributing to maintaining said performance.

For reference purposes, a 300 DN module of effective filtration length of 1.2 m and a fill factor of 55% provides a filtration area equal to:

70.5 m$^2$ with conventional hollow fibers as described above.

73 m$^2$ with filtration membranes according to the invention produced as described above.

In both cases, a ring 5 mm thick is installed on the inner circumference of the housing in order to distance the fibers and membranes from the inner surface of the housing which requires bonding. In the case of the membrane of the invention, the bonding area per membrane is 1.37×38 mm. Therefore, only 693 membranes, each individually protected and each containing 33 filter channels, are used to produce this module instead of 22,000 hollow fibers. This allows concluding that a high level of security is achieved with this novel manufacturing method.

The method thus enables the production of qualitatively more reliable membranes and also the creation of filtration modules that provide a more advantageous filtration area, the created filtration channels being produced in a smaller space.

Example 2—Membranes Based on Polyacrylonitrile (PAN)

To manufacture conventional membranes based on polyacrylonitrile (PAN), a polymer (collodion) mixture is prepared containing 18% polyacrylonitrile in the presence of 2% lithium chloride in N-methylpyrrolidone, while stirring at a temperature maintained at 70° C.

The collodion is then filtered through a wire mesh (5 micron filtration rating) and transferred to a storage tank where it is vacuum-degassed and then stored at a temperature of 40° C.

The precipitation liquid is water, degassed by ultrasound and then stored prior to use in a tank maintained at 40° C.

The hollow fiber is produced with the collodion and internal fluid at a temperature of 40° C. A specific extrusion spinneret is used to produce a fiber having an inner diameter of 0.90 mm and an outer diameter of 1.62 mm.

The spinning speed used is 18 m/min.

The external rinsing bath is filled with water maintained at 40° C. The fiber exiting the bath is advanced by a motorized roller which releases it into a basin filled with water. The water temperature is also maintained at 40° C. in this basin, where the rinsing of the fiber and thus the removal of residual solvent is completed.

After 24 hours of soaking in water, a long piece of fiber is cut to produce a module containing 12 fibers. The total length of this micromodule is equal to 30 cm, which represents an effective filtration length of 26 cm and a filtration area of 91 cm$^2$.

Measurement of water permeability in the micromodule yields a constant water permeability index equal to 290 l/h·m$^2$·bar at 20° C. The fibers obtained in this manner have a breaking load equal to 7.6 N and an elongation at break equal to 45%. Although these mechanical properties of elongation appear satisfactory, the crushing strength of these fibers appears low (feel flexible when touched, and crush quickly).

With the same collodion, a filtration membrane according to the invention is produced that is formed of 33 channels covered with two nonwoven supports having the following characteristics:

nonwoven polypropylene-based support of technical quality, specially processed for use as a membrane support.

support thickness of 95 microns.

weight index of the support is 34 g/m².

The above precipitation conditions are used. The conditions of the collodion and internal liquid flow rates are fixed so as to produce a membrane with channels 0.90 mm in diameter. Two nonwoven supports (effective width of 37 mm, total of 46 mm) are applied to the nascent multi-bore membrane in order to obtain a total thickness of 1.49 mm. As the mechanical strength of the nascent polyacrylonitrile membrane provides insufficient crushing strength, a thicker nonwoven support of 95 microns is used although it is quite possible to obtain a membrane of the invention having satisfactory mechanical performance with a support only 60 microns thick.

The two nonwoven supports serve to protect the fibers forming the channels of the filtration membrane of the invention. The membrane so formed is produced at a spinning speed of roughly 18 m/min. This membrane is then advanced as explained in Example 1, to be rinsed and cut into lengths of 1.4 m which fall into a basin containing water where the rinsing continues.

Samples of these membranes are then collected in order to fabricate a filtration module containing a single membrane that has an effective length of 26 cm (total length of 30 cm) and a filtration area of 243 cm².

As above, the water permeability of the filtration module just produced according to the invention is measured, to find that the water permeability index of the membrane is equal to 850 l/h·m²·bar at 20° C. One can see here that the difference between the water permeability of the membrane of the invention and of a conventional hollow fiber membrane is greater than with the fibers produced in Example 1. In Example 1 the ratio $Lp_{Invention}/Lp_{Fiber}$ was close to 2.3, while in this example the same ratio is close to 2.9.

This is explained by the fact that the rate of precipitation of the collodion used to produce PES membranes is faster than that of the collodion used to produce PAN membranes. In technical terms, the PAN nascent fiber falls into the rinsing bath when its outer surface has not completely finished gelling, so that the rinsing bath has more influence. In the case of the PES fiber, the outer surface of the nascent fiber is in a more advanced state of gelification. Here, the rinsing bath has less impact on the fiber performance.

To explain this phenomenon, we can say that the nascent fiber must be produced at a sufficiently slow spinning speed for it to be immersed in the rinsing bath only when its outer structure has solidified. The manufacture of membranes according to the method of the invention allows us to reach this state because it allows us to reduce the thickness of the porous support formed around the filter channels. In the case of hollow fibers, the thickness of the fiber must be fairly high in order to give it sufficient crushing strength. The nonwoven backing we use offers two advantages. Firstly, it protects the membrane surfaces from the handling devices as mentioned above. In addition, it also appears that decreasing the thickness of the membrane obtained according to the method of the invention has a positive impact on the filtration performance of the membrane.

We can show that a 300 DN module of effective filtration length of 1.2 m and a fill factor of 55% produces a filtration area equal to:

60 m² with conventional hollow fibers as described above.

68 m² with membranes according to the invention produced as described above.

In both cases, a ring 5 mm thick is installed on the inner circumference of the housing in order to distance the fibers and membranes from the inner surface of the housing which requires bonding. The bonding area of the membrane according to the invention is 1.49×40 mm. Therefore 610 membranes containing 33 filter channels are used instead of close to 17,600 conventional fibers.

On the other hand, in order to produce PAN hollow fibers, the diameter ratio is increased to 1.8 instead of the 1.7 for PES fibers. This gives the PAN fibers satisfactory crushing strength. With the method according to the invention, it is possible to maintain an equivalent ratio (1.62 for the PES membrane and 1.65 for the PAN membrane). For the membrane of the invention, this ratio is the ratio of the total thickness of the membrane and the channel diameter.

Example 3—Filtration Modules

The table below gives the filtration areas that can be provided by a filtration module manufactured according to the invention, having an inner diameter of 300 mm and an effective filtration length equal to 1,200 mm. Three configurations of membranes of the invention are considered:

1—A membrane 15 as illustrated in FIG. 6, having a single series of thirty-three channels 16 (Series 1) placed between two layers of support film 17 measuring 1.5 mm in total thickness, which is a bonding area of 1.5×40 mm. This membrane is suitable for all potential cut-offs, from microfiltration to nanofiltration.

2—A membrane 15 as illustrated in FIG. 7, having two series of thirty channels 16 (Series 2) placed between two layers of support film 17 measuring 2.7 mm in total thickness, which is a bonding area equal to 2.7×40 mm. This membrane is more suitable for high ultrafiltration, ultrafiltration, or nanofiltration applications.

Figure 8:
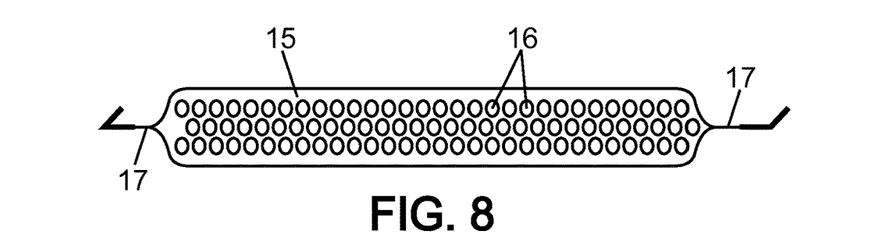
FIG. 8 is a cross-sectional view of a filtration membrane with three rows of channels obtained after implementing the method.

3—A membrane 15 as illustrated in FIG. 8, having three series of thirty channels 16 (Series 3) placed between two layers of support film 17 measuring 3.7 mm in total thickness, which is a bonding area of 3.7×42 mm. This membrane is more suitable for ultrafiltration and nanofiltration applications.

The filtration areas were calculated for two potential fill factors of the module (55 and 60%), while reducing the inner radius of the housing by 5 mm in order to place a centering ring allowing better adhesion of the head plate.

TABLE

Filtration areas provided according to fill factor and number of channels

| | Number of channels | Fill factor (%) | Number of membranes per module | Filtration area * (m²) |
|---|---|---|---|---|
| Series 1 | 33 | 55 | 605 | 68 |
| | | 60 | 660 | 74 |
| Series 2 | 60 | 55 | 336 | 68 |
| | | 60 | 367 | 75 |
| Series 3 | 90 | 55 | 234 | 71 |
| | | 60 | 255 | 78 |

We can immediately see that the filtration area which can be provided with membranes of the invention far exceeds that achievable with conventional hollow fibers of the same inner diameter. The advantage of this geometry is not limited to this aspect. Indeed, the number of membranes used is clearly reduced, and they have fibers that are particularly well-protected. In addition, the time taken to produce the membranes needed to equip the S3 module is less than 20 min, a very short time compared to standard values, despite a linear spinning speed equal to 20 m/min. This is also achieved while fully protecting the integrity of the membrane, since the filtration surface of the membrane and its outer surface do not come into contact with any element that could affect integrity. Similarly, the tools for producing this novel generation of membranes are limited to the members for preparing and feeding the collodion and internal precipitation liquid. Finally, the membrane can be advanced during manufacture by members mounted at its ends and which can securely adhere the two support layers. However, this is not always necessary because the compression of the two supports by the two drive rollers and the fiber covering which constitutes the support film may be sufficient to ensure complete adhesion of the membrane to the supports so applied. Finally, the path of the nascent membrane within the two slides (flattened U-shaped tube) positioned one on each side, forms a rinsing path that maintains membrane integrity better than any known method.

Example 4—Filtration Membrane of the Invention Having Channels of Large Diameter In the case of hollow fibers of large diameter, the crushing and bursting strength of the fibers requires a substantial thickness. For a fiber having an inner diameter of 2.7 mm, the outer diameter must be at least equal to 5 mm. This creates many difficulties related to the following:
  First, the amount of collodion used is quite large: for one m² of effective area produced, close to 2.3 liters of collodion will be used, excluding waste.
  The nascent fiber is manipulated very carefully, as the fiber quickly bends and may flatten whenever it touches a handling device. This forms a fiber which has an oval shape and unequal thickness, which is very fragile when compressed or crushed.
  The outer skin of such a fiber requires using a very low spinning speed in order to be as independent as possible of the rinsing bath composition.
Other difficulties relate to the mechanical strength of the fibers during use. A minimal loss of fiber integrity can easily result in fracture propagation from a starting point of fracture, which affects retention of the products to be stopped by the membrane.

Figure 9:
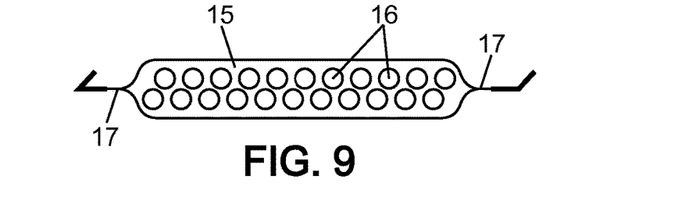
FIG. 9 is a cross-sectional view of a filtration membrane with two rows of channels of large diameter, obtained after implementing the method.

In contrast, it is possible to produce a membrane according to the invention equipped with numerous filtering channels having a diameter equal to 2.7 mm and to use a thinner wall. This is possible due to the presence of the support film acting as a protective layer advantageously lined with a separating mesh (here acting as a reinforcement), which gives the membrane the following advantages:
  The support layer and its irrigation mesh become a layer of mechanical reinforcement, which reduces the thickness of the membrane wall without any risk of reducing the crushing strength of the membrane. In the present case, a protective layer having a total thickness equal to 0.250 mm is used, of which 0.050 mm is provided by the mesh.
  FIG. 9 shows a membrane 15 according to the invention equipped with twenty-two channels 16 that are 2.7 mm in diameter. This membrane is made with a support film 17 having a total thickness of 7.7 mm and a width of 42 mm (bonding area 7.7×46 mm). To produce one m² of this membrane, only 1.1 liters of collodion are used, excluding waste: this is a 52% reduction in the amount of collodion, replaced in part by the support which is formed of less technical material but better reinforces the mechanical strength of the membrane and its stability over time.

Note that the time required to produce 1 m² of membrane according to the invention is at least halved. Although some membrane manufacturers are able to produce up to 16 hollow fibers in parallel, the method of the invention can increase the linear production speed by 50 or even 100%. In addition, the method of the invention ensures that the membrane, and more particularly the hollow fibers thereof, are not damaged by the handling devices, which is not the case with other known manufacturing methods. Finally, the membrane channels formed by the hollow fibers so created are perfectly cylindrical, while individually produced hollow fibers of large diameter are often flattened or given an oval form by their contact with the advancement means. This last detail is very important because such deformed fibers age very badly and fairly quickly end up generating mechanical fractures that propagate, similarly to a welded tube split along its length.

Example 5—Filtration Membrane of the Invention with Buffer Zone

Figure 10:
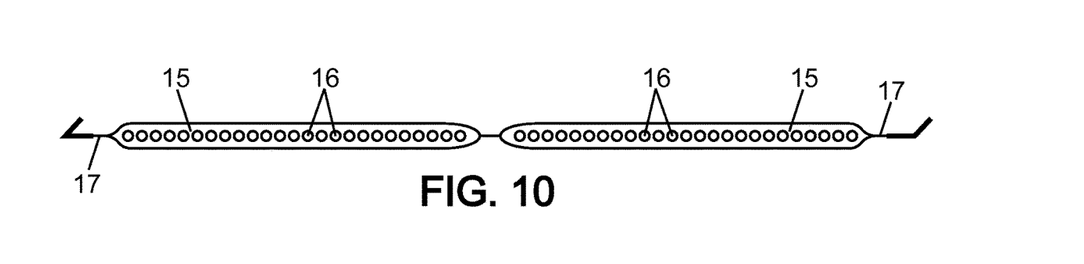
FIG. 10 is a cross-sectional view of a filtration membrane with a single row of channels and a crushed buffer area, obtained after implementing the method.

FIG. 10 illustrates a membrane according to the invention, created with an intermediate buffer zone. In this membrane 15, formed for example with one row of channels, fifty channels 16 of 0.9 mm are placed along a total effective width of the support film 17 that is equal to 70.7 mm (which is a bonding area of 1.5×75 mm). As before, the thickness of this membrane is equal to only 1.5 mm, which allows providing a large filtration area per unit volume.

This configuration provides an important advantage:
  1—For an effective filtration length equal to 1.2 m, the filtration area for each membrane element is 0.17 m².
  2—In a housing which has an inner diameter of 300 mm, it is easy to obtain a total filtration area of between 55 and 60 m² depending on the fill factor applied (respectively 55 and 60%).
  3—Although some of the available filtration area is lost per module, the produced membranes are fitted into the module more quickly (+50%), and production is managed with a more compact and more productive tool.
  4—To produce a module providing 60 m² of filtration area, only 352 properly protected membranes are manipulated rather than 19,200 self-supporting, fragile hollow fibers that require more collodion.

Many opportunities therefore exist for producing diverse forms, each providing specific advantages. The main and key advantage of the method of the invention lies in the fact that it ensures production of filtration membranes in the manner that best provides the appropriate performance. This concept also allows producing membranes which have unmatched hydraulic and mechanical properties.

The invention claimed is:
1. A method for manufacturing a flat filtration membrane, that includes a plurality of channels, the method comprising:
  a) selecting and preparing a collodion,
  b) injecting the collodion into at least one channel of an extrusion spinneret that further comprises a core and an outlet,
  c) injecting an internal liquid into a plurality of hollow centering needles, wherein each centering needle comprises a channel positioned at the core of the extrusion spinneret,
  d) applying a first protective support film at the outlet of the extrusion spinneret, unrolling the first protective support film onto a first face of a flat filtration membrane emerging from the outlet of the extrusion spinneret, the filtration membrane having a plurality of filtration channels, e) applying a second protective support film at the outlet of the extrusion spinneret, unrolling the second protective support film onto a second face of the filtration membrane emerging from the outlet of the extrusion spinneret, f) immersing the filtration membrane with the first and second support films in a rinsing solution, g) ending the rinsing of the filtration membrane.

2. The method according to claim 1, wherein the first and second protective support films adhere to the collodion and the filtration membrane emerging from the extrusion spinneret is drawn by a traction force exerted on the first and second protective support films.

3. The method according to claim 2, wherein the traction force exerted on the first and second protective support films is applied to lateral ends of the first and second protective support films, without direct stress on the filtration channels.

4. The method according to claim 1, wherein the internal liquid comprises degassed water or degassed water mixed with another substance.

5. The method according to claim 1, wherein, during step b), the collodion and the internal liquid have a temperature of between 30 and 60° C.

6. The method according to claim 1, wherein at least one of the first and second protective support films is a nonwoven polypropylene-based support.

7. The method according to claim 1, wherein the number of filtration channels is no less than 20.

8. The method according to claim 1, further comprising selectively crushing the filtration membrane to ease a subsequent folding of the filtration membrane.

* * * * *